F. LAVAN.
MACHINE FOR PACKING EXPLOSIVES KNOWN AS GELATIN INTO PAPER SHELLS.
APPLICATION FILED FEB. 21, 1913.
1,144,216.
Patented June 22, 1915.
6 SHEETS—SHEET 1.
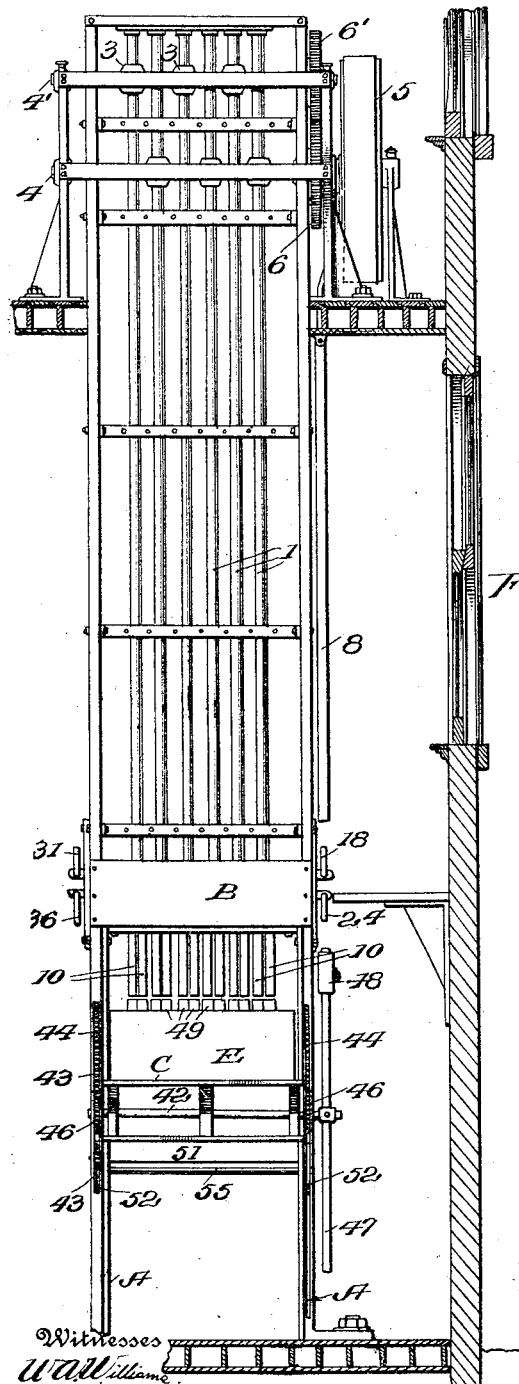
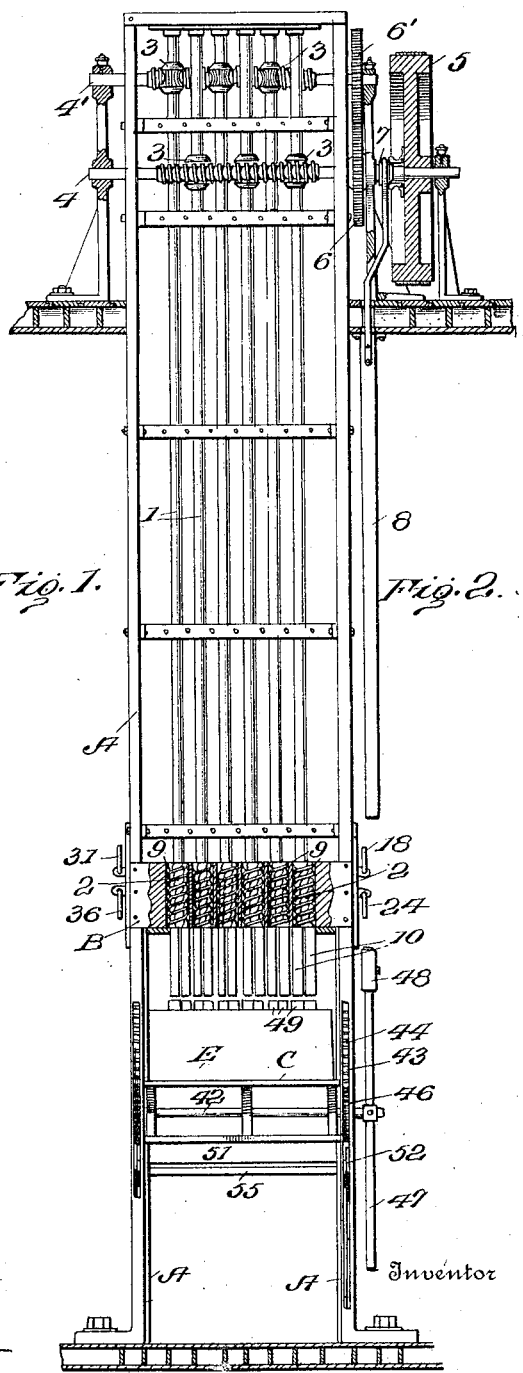

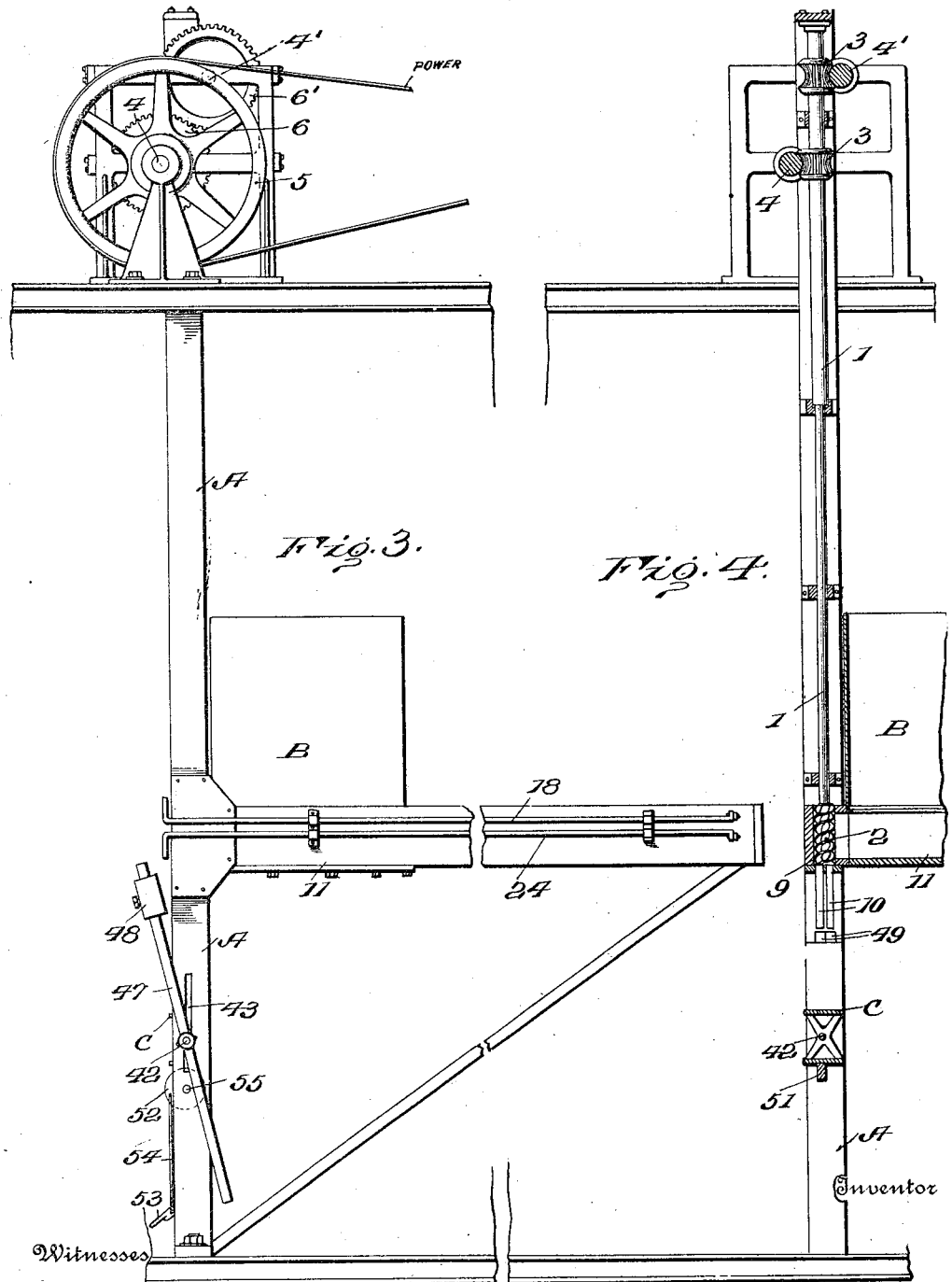

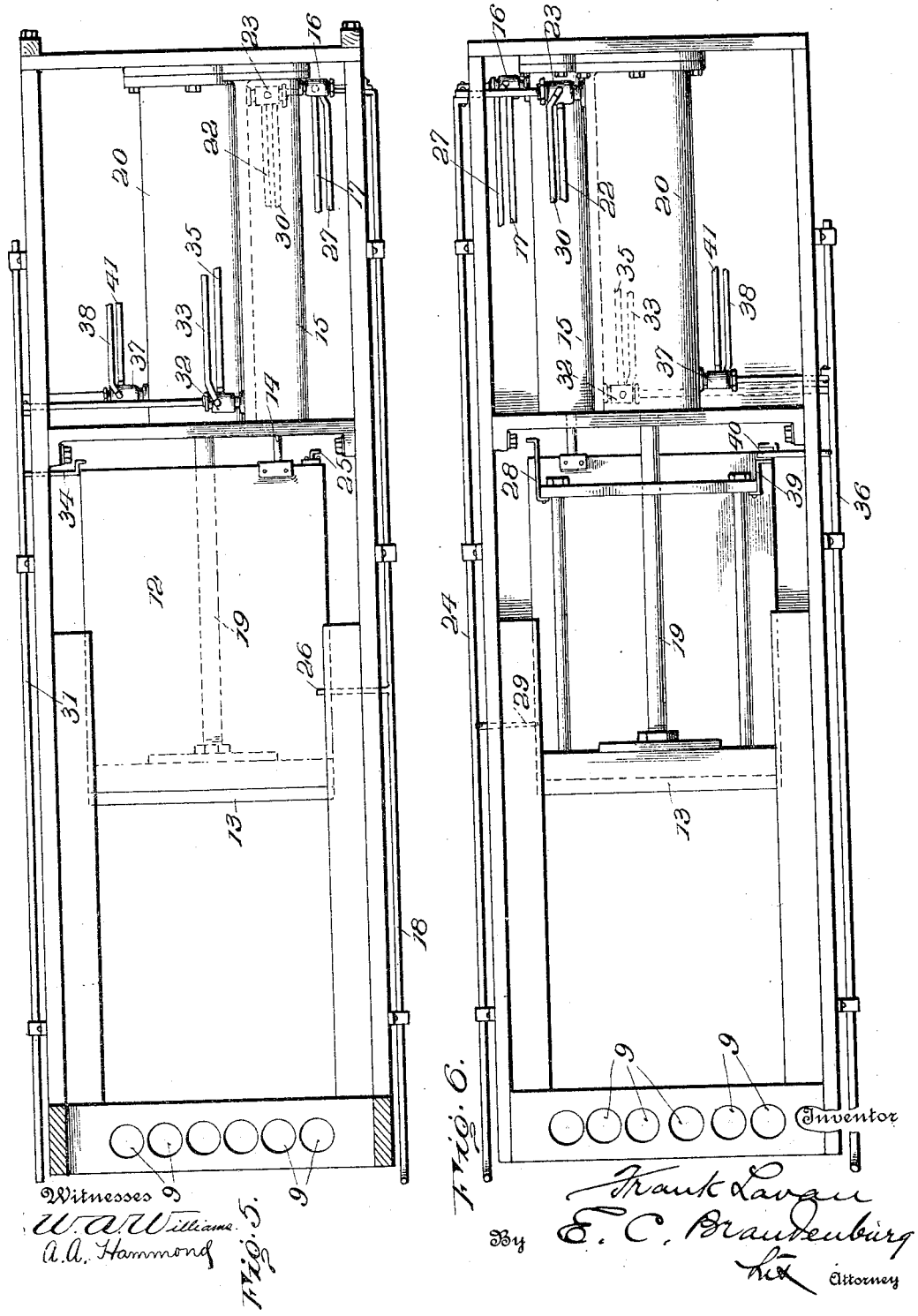

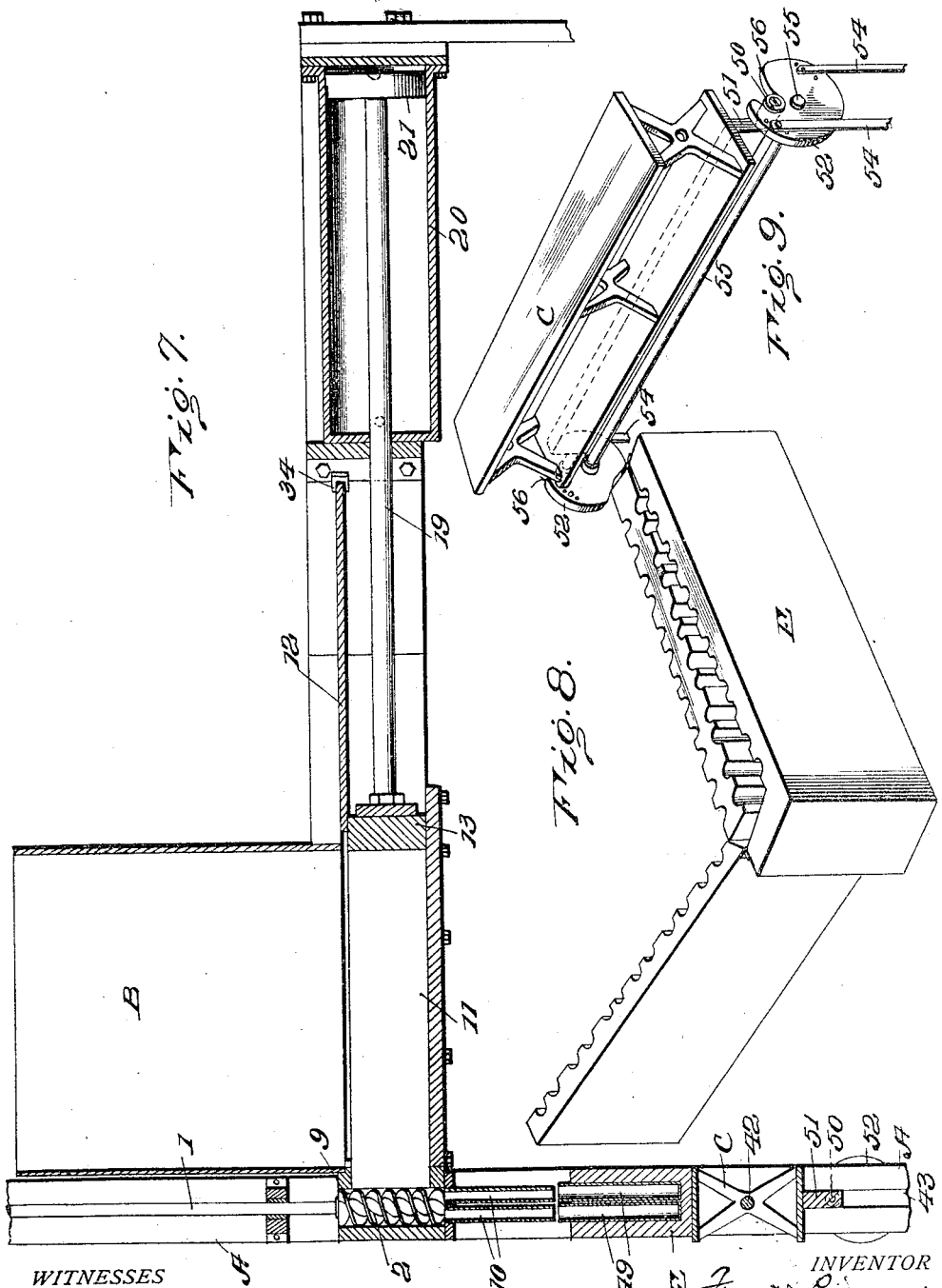

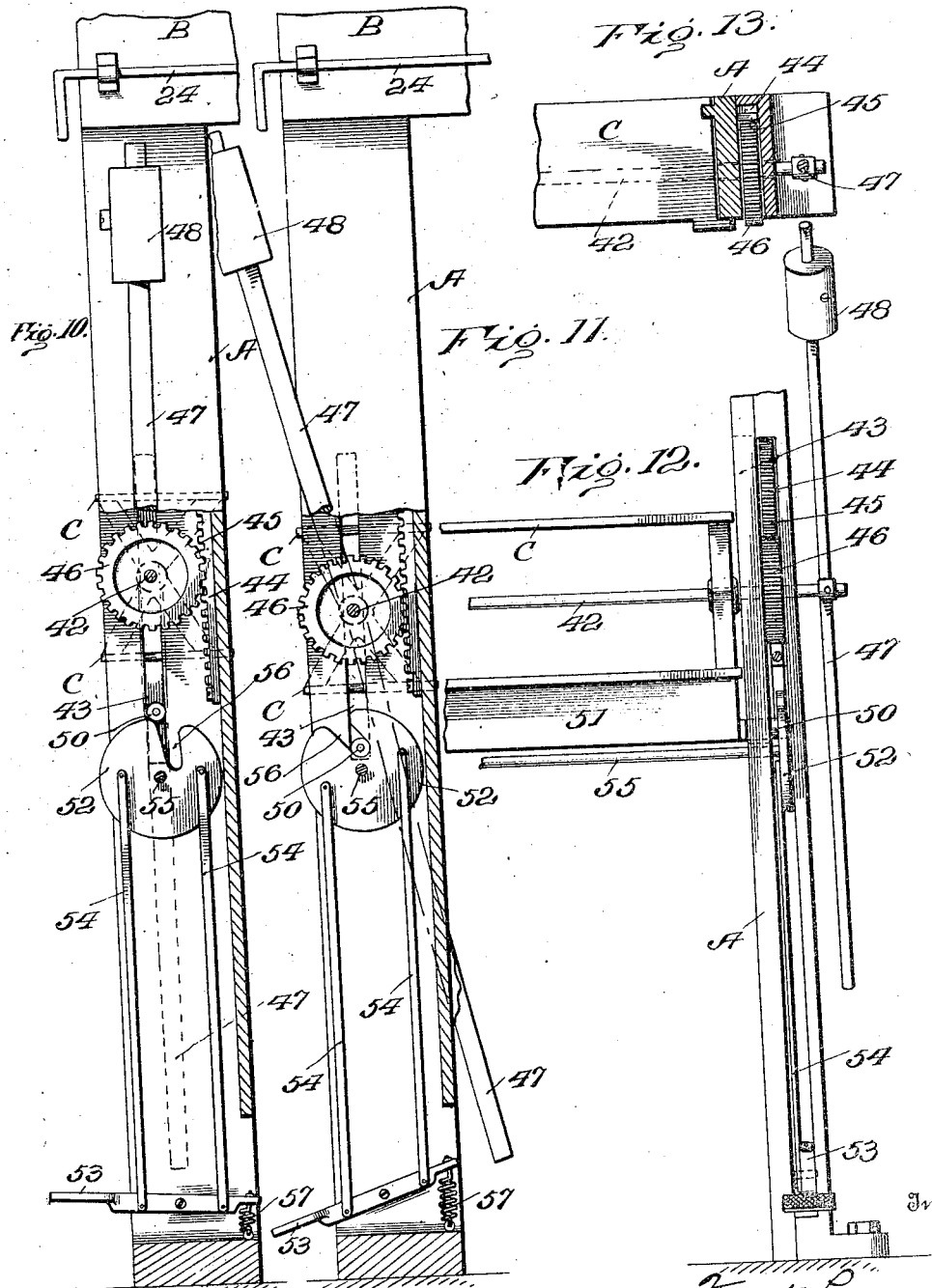

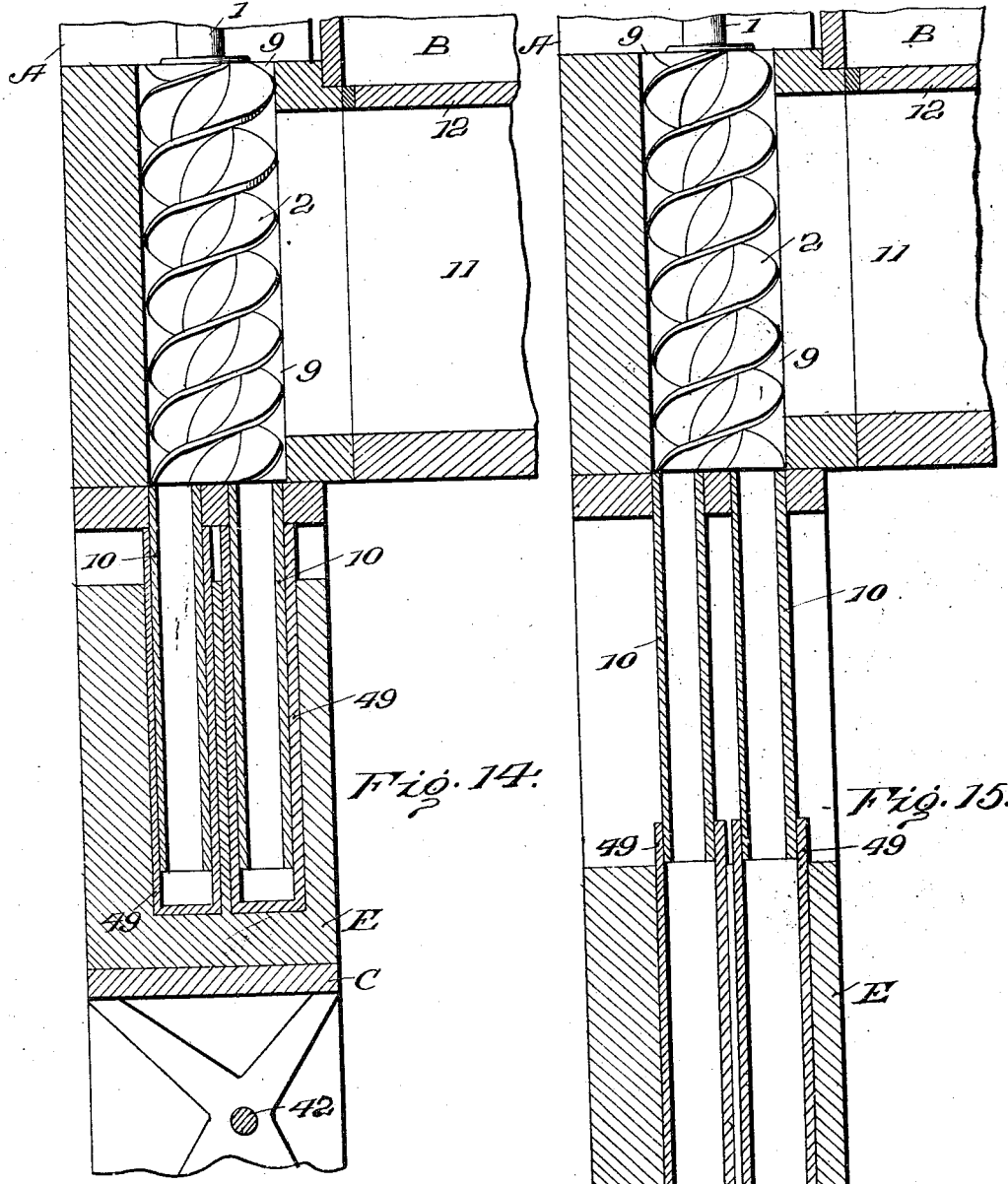

UNITED STATES PATENT OFFICE.

FRANK LAVAN, OF MILLER, INDIANA, ASSIGNOR OF ONE-THIRD TO CHARLES A. BLANK, OF MILLER, INDIANA.

MACHINE FOR PACKING EXPLOSIVES KNOWN AS GELATIN INTO PAPER SHELLS.

1,144,216.

Specification of Letters Patent. Patented June 22, 1915.

Application filed February 21, 1913. Serial No. 750,006.

*To all whom it may concern:*

Be it known that I, FRANK LAVAN, a citizen of the United States, residing at Miller, in the county of Lake and State of Indiana, have invented certain new and useful Improvements in Machines for Packing Explosives Known as Gelatin into Paper Shells, of which the following is a specification.

My invention relates to an improvement in machines for filling or packing an explosive known as gelatin into paper shells. Gelatin, the common and commercial name by which this explosive is known, is manufactured in some dynamite mills and contains nitro-glycerin, gelatin, gun cotton, pulp, soda, etc., and when ready to be packed in the shells has an appearance of well kneaded bread dough, and while sometimes darker in color, it varies with manufacturing conditions and grade of explosive power. It resembles bread dough in consistency, but the principal grades, however, are less sticky than bread dough and quite readily broken apart.

The object of this invention is to conduct the shells to a point where the gelatin will be fed to the shells through tubes and as the shells are filled they are caused to move away from the tubes until the shells are filled within an inch of the top thereof. When the shells have been filled within about an inch of the top thereof, the carrier or conveyer of the shells is stopped in its descent and the feeding mechanism which feeds the dough or gelatin to the shells, is stopped so that the feed of the gelatin will be cut off. After the mechanism has been stopped for feeding the gelatin to the shells, means is operated for lowering the shells below the tubes of the feeding mechanism a sufficient distance for the purpose of removing the loaded shells and permitting of another case or tray of shells being placed in position to be conducted through the tubes for the purpose of filling.

Another object is in the provision of means for cutting a predetermined quantity of the dough and then feeding or forcing the doughlike gelatin to the feeding mechanism for the purpose of conducting the gelatin to the empty shells. This mechanism for cutting the dough and for feeding it to a position to be fed to the shells, is caused to be actuated by compressed air, but after the mechanism has performed this function it is automatically returned to its original or normal position.

The invention consists of certain novel features of construction and combinations of parts which will be hereinafter more fully described and pointed out in the claims.

In the accompanying drawings—Figure 1 is a view in front elevation of the machine; Fig. 2 is a similar view showing certain parts broken away; Fig. 3 is a view in side elevation; Fig. 4 is a vertical sectional view; Fig. 5 is a top plan view of the hopper cutting blade and compressed air tanks; Fig. 6 is a bottom plan view showing the piston in full lines which forces gelatin to the feeding screws; Fig. 7 is a longitudinal vertical sectional view through the hopper blade and piston; Fig. 8 is a perspective view of the cartridge shuttle; Fig. 9 is a perspective view of the shuttle carrier; Figs. 10 and 11 are views showing one of the uprights of the frame in section disclosing two positions taken by the shuttle carrier in its descent; Fig. 12 is an enlarged detail view showing the manner of operating the carrier; Fig. 13 is an enlarged detail view showing the manner of mounting the carrier with respect to the frame; Figs. 14 and 15 are enlarged views showing the position taken by the shells at the beginning of the filling operation and the position assumed by the shells upon the completion of the filling operation.

A represents two standards which extend from one floor and into the second floor, the operating machinery being preferably supported and mounted upon the second floor of the building so that there is little or no danger of any of the working parts coming into contact with the explosive. Carried by the uprights are a plurality of rods 1, 1, which are provided with feeding screws 2, 2. Each shaft is provided with a worm gear 3 which meshes with a worm shaft 4, the worm shaft being driven by a suitable pulley 5 and the worm shaft 4 is in gear with another shaft 4' by means of gears 6, 6. A clutch 7 is mounted upon the main shaft 4 for connecting and disconnecting the pulley wheel 5 with the shaft for rotating the rods 1, the shaft being shifted by means of a lever 8.

The gelatin hopper B is provided at one end with a plurality of openings 9 in which the screws 2 operate, and connected with the bottom of the screw chambers are brass tubes 10, 10. The gelatin is fed from the hopper B into a receiving chamber 11 and the quantity of gelatin which is discharged into the receiving chamber 11 is separated from the contents in the hopper B by means of a knife 12. A piston 13 is received in the receiving chamber 11 for causing the contents of the chamber to be forced to the feeding screws whereby the gelatin will be fed by the screws into the tubes 10, 10.

The blade 12 and the plunger piston 13 are actuated by compressed air. In Figs. 5, 6 and 7 I have disclosed these parts more in detail and by reference to Fig. 5 it will be seen that the blade 12 is provided with a piston rod 14 which extends into a cylinder 15. A valve 16 is connected to one end of the cylinder 15 and connected to the valves is an inlet pipe 17 through which air is conducted from any suitable source, not shown, to the cylinder upon the actuation of the rod 18. The rod 18 operates the valve 16 for admitting air from the pipe 17 into the cylinder 15 for causing the blade to move across the bottom of the hopper B for cutting the gelatin which has been discharged into the receiving chamber 11 and preventing the gelatin from passing into the receiving chamber.

The plunger piston 13 is provided with the piston rods 19 which extend into the cylinder 20. The piston rod is provided with a piston 21 which is actuated by compressed air which is admitted to the pipe 22 through a valve 23, the valve 23 being actuated by means of a rod 24 for causing the piston 21 to be moved for forcing the plunger 13 against the gelatin and forcing the gelatin to the feeding screws 2. When the knife or blade 12 is moved practically the limit of its stroke, a trip 25 carried by the slide engages an arm 26 on the rod 18 forcing the rod to be actuated and thereby turning the valve 16 and allowing the air to escape through the pipe 27. A trip 28 carried by the piston rod 19 will engage an arm 29.

When the piston plunger 13 is moved practically the limit of its stroke, it causes the rod 24 to be actuated for the purpose of operating the valve 23 to allow the air to escape from the casing through a pipe 30. When both the knife and the plunger have completed their stroke and the gelatin has been fed to the screws and it is desired to admit an additional quantity of gelatin to be discharged into the chamber 11, the rod 31 is actuated for operating the valve 32 which is connected with an air supply by a pipe 33 and which valve is connected to a cylinder 15 whereby air is admitted in front of the piston in the cylinder, causing the blade to be moved rearwardly, and during its movement the blade will strike a projection 34 on the rod 31 for actuating the rod whereby the valve will be turned and allow the air in the casing to be discharged through a pipe 35. The plunger 13 is also returning to its rearmost position and the rod 36 is connected to a valve 37. This valve 37 is connected to the cylinder 20 and connected to the valve is an air supply pipe 38 whereby the air is admitted to the cylinder 20 and in front of the piston 24 for causing the piston to move through the cylinder for drawing the piston plunger 13 rearwardly. A projection 39 on the piston plunger 13 engages an arm 40 on the rod 36 which operates the rod for causing the valve 37 to be actuated to permit of air in the cylinder 20 to escape through a pipe 41.

Mounted between the uprights A is a shuttle carrier C. The shuttle carrier is provided with a shaft 42 which extends through the uprights which are provided with elongated slots 43. Rack bars 44 are mounted in slots 45 of the uprights and meshing with the teeth of the rack bar are gear wheels 46, the gear wheels 46 being mounted upon the shaft 42. The shuttle carrier C has mounted thereon a shuttle E such as shown in Fig. 8 in which paper cartridges or shells are placed which shells are fed onto the brass tubes 10, through which the gelatin is discharged by the screws 2. The shaft 42 has mounted thereon a lever 47 which is provided at one end with a weight 48 which can be adjusted along the lever. By throwing this lever the carrier will be caused to travel upward, bringing the shells 49 into a position so that they will receive the brass tubes 10 within an inch of the bottom of the shells. The gelatin is now fed into the tubes, the clutch 7 having been thrown into engagement with the pulley 5 thereby transmitting power to the rods, causing the screws 2 to rotate. The gelatin is fed through the tubes 10 and as it passes through the tubes into the shells 49 the shells and carriers C are gradually descending or moving away from the tubes. The descent of the carrier is governed by the position of the weight 48 upon the lever 47, that is, the position of the weight will govern the back pressure that is exerted against the downward movement of the shells and regulates the manner of packing as to whether the shells will be packed light or heavy.

When the shells have moved downward due to the filling operation to within an inch of the top thereof, rollers 50 carried by an extension 51 of the carrier C engage the peripheries of the slotted wheels 52 thereby stopping the descent of the shells and carrier and the operator will then throw out the clutch 7 by means of the lever 8 and stop the feeding action. A foot lever 53 is mounted upon the uprights and connecting one of the wheels 52 with the foot lever are links 54, 54. The two wheels 52 are connected together by means of a shaft 55 so that the operation of one wheel causes the actuation of both. Now by pressing down upon the lever 53 the wheels 52 will be oscillated, causing the rollers 50 to travel down into the slots 56 of the wheels 52, thereby lowering the shells one and a half inches below the lower ends of the tubes 10 so that the shuttle and shells can easily be removed from the shuttle carrier C and another shuttle of empty shells can be placed upon the shell carrier for the next filling operation. Upon the movement of the shuttle carrier away from the wheels 52 a spring 57 will cause the wheels 52 to be drawn to a position whereby the rollers 50, upon the descent of the carrier, will come into contact with the periphery of the wheels.

Having fully described my invention, what I desire to secure by Letters Patent, is:—

1. In a gelatin packing machine, the combination with a hopper, of feeding means in the hopper for discharging the contents of the hopper therefrom, a movable shuttle carrier upon which the shells to be filled are carried, means for actuating the shuttle carrier, said shuttle carrier adapted to automatically move away from the hopper as the shells are being filled and means engaging the carrier when the shells have been sufficiently filled for moving the carrier to a position whereby the shells can be removed from the carrier.

2. In a gelatin packing machine, the combination with a hopper, of feeding means in the hopper for discharging the contents of the hopper therefrom, a movable shuttle carrier upon which the shells to be filled are carried, means for actuating the shuttle carrier, said shuttle carrier adapted to automatically move away from the hopper as the shells are being filled, means for limiting said movement of the shuttle carrier, and causing the carrier to be moved to a position for the removal of the shells therefrom.

3. In a gelatin packing machine, the combination with a hopper having means therein for feeding the gelatin therefrom, of a movable shuttle carrier upon which the shells to be filled are mounted, means for operating the carrier for bringing the shells to a position with respect to the hopper for the purpose of filling the shells, said carrier automatically moving away from the hopper during the filling operation, means for limiting the rearward movement of the carrier for preventing the shells from being entirely filled, and means for actuating said last-named means for moving the carrier to a position for the removal of the shells from the carrier.

4. In a gelatin packing machine, the combination with a hopper having means therein for discharging the contents therefrom, and tubes connected to the hopper through which the gelatin is fed, of a movable shuttle carrier upon which the shells to be filled are carried, means for operating the carrier to cause the shells to be moved toward the hopper, and in which shells the tubes extend, said carrier adapted to automatically move from the hopper as the shells are being filled, means for limiting the movement of the carrier for the purpose of preventing the shells from being entirely filled, means for cutting off the feed of gelatin from the hopper, and means for actuating the means for limiting the movement of the carrier and causing the carrier to be moved to a position to disengage the shells from the tubes and permit of the shells being removed from the carrier.

5. In a gelatin packing machine, the combination with a hopper having means therein for feeding the gelatin therefrom, of a movable shuttle carrier upon which the shells to be filled are mounted, means for operating the carrier for bringing the shells to a position with respect to the hopper for the purpose of filling the shells, said carrier automatically moving away from the hopper during the filling operation, slotted wheels adapted to engage the shuttle carrier in its rearward movement on the peripheries of the wheels for limiting the rearward movement of the shuttle carrier, an extension on said shuttle carrier, and means for oscillating said slotted wheels for causing the extension of the shuttle carrier to enter the slots of the wheels for the purpose of lowering the shuttle carrier sufficient distance beneath the hopper to permit of the removal of the shells from the carrier.

6. In a gelatin packing machine, the combination with a hopper of means for cutting a predetermined amount of the gelatin, feeding means connected to the hopper for discharging the quantity of gelatin cut from the hopper, means for forcing the quantity of gelatin cut into the path of the feeding means, a movable shuttle carrier having shells mounted thereon, means for operating the shuttle carrier to cause the shells to be fed into a position with respect to the hopper for the purpose of filling the shells and means engaging the carrier when the shells have been sufficiently filled for moving the carrier to a position whereby the shells can be removed from the carrier.

In testimony whereof I affix my signature in the presence of two witnesses.

FRANK LAVAN.

Witnesses:
DWIGHT M. KINDER,
Mrs. J. NORTON.